United States Patent Office 3,297,635
Patented Jan. 10, 1967

---

3,297,635
PROCESS FOR CURING POLYEPOXIDES AND RESULTING PRODUCTS
Elliot Bergman and William De Acetis, Berkeley, Calif., assignors to Shell Oil Company, New York, N.Y., a corporation of Delaware
No Drawing. Filed May 31, 1963, Ser. No. 284,365
14 Claims. (Cl. 260—47)

This invention relates to a process for curing polyepoxides. More particularly, the invention relates to a new process for curing polyepoxides using a special type of cyclic polymercaptan curing agent, and to the useful products obtained therefrom.

Specifically, the invention provides a new process for curing and resinifying polyepoxides at a rapid rate at low reaction temperatures which comprises mixing and reacting the polyepoxide with cyclic compounds, and preferably heterocyclic compounds substituted on at least three different ring elements with a radical containing a —SH group, and preferably in addition an accelerating material such as a tertiary amine. The invention further provides cured products obtained by the above-described process.

Polyepoxides, such as, for example, those obtained by reacting epichlorohydrin with polyhydric phenols in the presence of caustic, are promising materials for use in many industrial applications as they can be reacted with curing agents to form insoluble infusible products having good chemical resistance. The conventional polyepoxide-curing agent systems, however, have certain drawbacks that have limited their use for certain applications. For example, the known systems take considerable time to cure at low temperatures. With the best aliphatic type amine curing agents, the systems take several hours to set to a hard product. Because of this, it has been difficult to use the polyepoxide systems for applications, such as highway coatings, maintenance surface coatings and the like, where the coating must dry in a very short time.

It has been found that certain types of polymercaptans can be used to cure the polyepoxides at a rapid rate at the low temperatures. The use of these materials, however, has been limited because they have a strong odor, in some cases are toxic, and in most cases are very thick liquids or solids which are difficult to mix with the polyepoxides. Furthermore, the properties of the cured products are not as good as desired for certain applications.

It is an object of the invention, therefore, to provide a new process for curing polyepoxides. It is a further object to provide a new process for curing polyepoxides at a fast rate at low temperatures. It is a further object to provide a process for curing polyepoxides to a hard product in a matter of minutes. It it a further object to provide a process for curing polyepoxides at a fast rate to form products having good strength and resistance to water, solvents and alkali. It is a further object to provide new low temperature curing agents for polyepoxides which have little or no odor. It is a further object to provide new curing agents for polyepoxides which are substantially non-toxic. It is a further object to provide new class of polymercaptans that can be used to cure polyepoxides at low temperatures. These and other objects of the invention will be apparent from the following detailed description thereof.

It has now been discovered that these and other objects may be accomplished by the use as curing agents for the polyepoxides of certain cyclic, and preferably heterocyclic, compounds substituted on at least three different elements in the ring with a radical containing a —SH group, such as, for example, a tri(mercaptoalkyl) trioxane compound. It has been found that these special polymercaptans when combined with the polyepoxides, particularly in combination with an accelerator such as a tertiary amine, cure the polyepoxide in a matter of minutes to form a hard coating. Furthermore, the cured product has excellent hardness and strength and good resistance to water, solvents and alkali. Of particular importance is the fact that these special mercaptans have little, if any, odor, are substantially non-toxic and are generally liquids which can be easily mixed into the polyepoxide compositions without the use of solvents or diluents.

The new curing agents to be used in the process of the invention comprise the cyclic, and preferably heterocyclic, compounds which are substituted on at least three different elements in the ring with a radical containing a mercapto group. The compounds are preferably mononuclear but may contain two or more ring structures which may be separate or joined together. The mercapto groups are preferably not more than 6 carbon atoms removed from the ring. In addition, the rings are preferably 5 to 7 membered rings and preferably contain in addition to carbon a heteroatom, such as oxygen, sulfur, nitrogen, phosphorous and the like.

Examples of these compounds include, among others the trioxanes, trithianes, dioxathianes, oxadithianes, oxazines, triazines, thiazines, dithiazines, dioxarsenoles, oxathiazoles, dithiazoles, triazoles, dioxalanes, isoxazoles, isothiazoles, dioxaborines, dioxazines, thiadiazines, and the like, which have at least three mercapto-substituted radicals attached to the said rings.

Specific examples of these include, among others, 2,4,6-tris(beta-mercaptoethyl) 1,3,5-trioxane
2,4,6-tris(beta-mercaptoethyl) 1,3,5-trithiane
2,4,6-tris(mercaptomethyl) 1,3,5-trioxane
2,4,6-tris(mercaptomethyl) 1,3,5-trithiane
2,4,6-tris(beta-mercaptoethyl) 1,3-dioxa-5-thiane
2,4,6-tris(beta-mercaptoethyl) 1-oxa-3,5-dithiane
2,4,5-tris(beta-mercaptoethyl) 1,3-dioxalane
2,4,5-tris(mercaptomethyl) 1,3-dioxalane
2,4,6-tris(alpha-methyl-beta-mercaptoethyl) 1,3,5-trioxane
2,4,6-tris(beta-methyl-beta-mercaptoethyl) 1,3,5-trithiane
2,4,6-tris(beta-mercaptobutyl) 1,3,5-trioxane
2,4,6-tris(beta-mercaptohexyl) 1,3,5-trithiane
2,4,6-tris(beta-phenyl-beta-mercaptoethyl) 1,3,5-trioxane
2,4,6-tris(beta - cyclohexyl - beta - mercaptoethyl) 1,3,5-trioxane
2,4,6-trimercapto 1,3,5-trioxane
2,4,6-trimercapto 1,3,5-trithiane
2,4,6-tris(1-thia-4-mercaptobutyl) 1,3,5-trioxane
2,4,6-tris(1-oxa-4-mercaptobutyl) 1,3,5-trioxane
2,3,6-tris(beta-mercaptoethyl) 1,4-oxazine
2,4,6-tris(3-mercaptopropyl) 1,3,5-triazine
2,4,6-tris(mercaptomethyl) 1,3,5-triazine
2,4,6-tris(beta-mercaptoethyl) 1-thia-3,5-diazine and

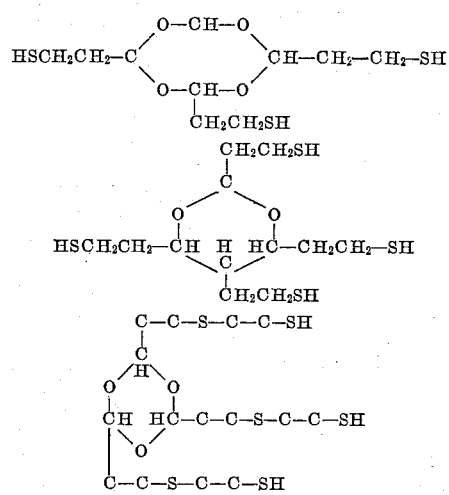

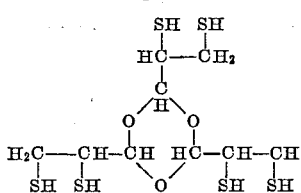

and

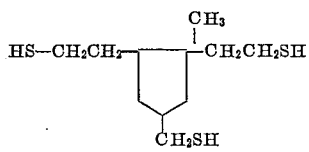

Also included in the above are the polymeric polymercaptans as obtained by joining two or more of the above compounds together as

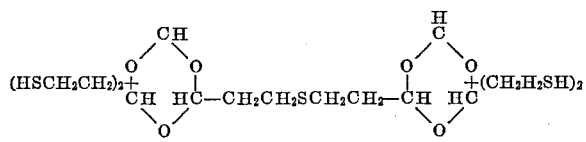

or by coupling reactions with dialdehydes and the like.

Preferred members of the above group comprise the heterocyclic polymercaptans of the general formula

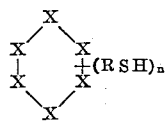

wherein at least one X is a member of the group consisting of oxygen, sulfur and nitrogen, and the remaining X's are carbon atoms which when not attached to the mercaptan containing radical are attached in the remaining valences to members of the group consisting of hydrogen, halogen and alkyl radicals, and R is a bivalent hydrocarbon radical and $n$ is an integer of 3 to 5.

Particularly preferred polymercaptans are those of the formula

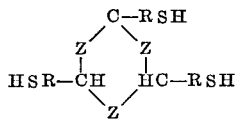

wherein Z is a member of the group consisting of oxygen, sulfur and nitrogen and R is a bivalent hydrocarbon radical, preferably containing from 1 to 6 carbon atoms.

Of special interest are the poly(mercaptoalkyl) trioxanes, poly(mercaptoalkyl) trithianes, the poly(mercaptoalkyl) triazines, and combinations thereof, such as the poly(mercaptoalkyl) thiadioxanes, wherein the alkyl groups contain from 1 to 5 carbon atoms.

Of particular interest are the cycloaliphatic acting (i.e., nonaromatic) heterocyclic oxygen containing and sulfur containing products and especially those derived by trimerization, cotrimerization, tetramerization, co- and tri-tetramerization of chlorinated aldehydes and then converting to the meracpto derivative as noted below.

The polymercaptans of the present invention can be prepared by a variety of methods. They may be prepared, for example, by reacting the corresponding chloride compound with an alkali metal salt of a thioalkanoic acid, such as sodium thioacetic acid and then refluxing the resulting thioester with methanol or ammnoia to form the mercaptan product. This reaction may be illustrated by the following equation showing the preparation of 2,4,6- tris(beta-mercaptoethyl) 1,3,5-trioxane from 2,4,6-tris-(beta-chloroethyl) 1,3,5-trioxane:

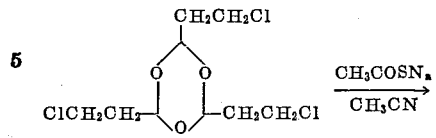

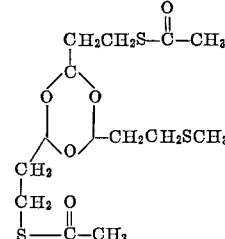

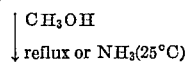

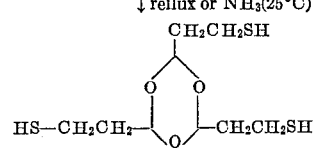

The starting material in the above reaction are those compounds as described above wherein a halogen replaces the mercapto group. The preferred halogenated compounds of this type are preferably obtained by the trimerization, tetramerization of halogenated aldehydes, such as chloropropionaldehyde chloracetaldehyde, dichloropropionaldehyde and the like. In making these, one may use the same or mixture of aldehydes, or mixtures with non-halogen containing aldehydes.

The alkali metal salt of a thioalkanoic acid employed in the reaction is preferably a sodium salt, such as sodium thioacetate. This salt is employed in at least one molar amount for every halogen atom to be converted, and preferably in an excess, such as up to 30 or 40% excess of the theoretical amount.

The reaction may be accomplished with or without solvents or diluents, but it is generally preferred to utilize solvents, such as acetonitrile, tetrahydrofuran, dimethyl formamide, dimethyl sulfoxide, methanol and the like.

The reaction with the alkali metal salt is preferably accomplished by applying heat, with preferred temperatures varying from about 50° C. to 100° C. In general, it is preferred to conduct the reaction at reflux temperature.

The resulting thioesters may be recovered as such before conversion to the mercaptan derivative or they may be further treated without recovery. The thioesters may be recovered by filtration to remove the salt formed in the reaction, and then extracted or stripped to remove the solvents or diluents employed in the reaction mixture. When recovered, the thioesters appear as fluid liquids to crystalline solids. They possess at least three thioester groups, i.e.,

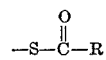

groups and can be utilized in various applications, such as plasticizers, etc., in addition to their use as intermediates for the preparation of the polymercaptans.

The thioester can be converted to the mercaptan by any suitable method. One method comprises reacting the thioester with alcohol or with ammonia. The preferred method comprises reacting the thioester with at least an equivalent amount of alcohol, such as methanol, i.e., at least one mole of alcohol per thioester group to be converted. This reaction is preferably accomplished by application of heat, e.g., temperatures ranging from about 50° C. to 100° C., and still more preferably at the reflux temperature. If ammonia is employed, it is preferably bubbled into an alcohol solution of the thioester and the mixture allowed to stand at room temperature for several hours.

The desired polymercaptan can be recovered from the reaction mixture by any suitable method, such as extraction, distillation and the like. It is generally preferred to strip out the solvent and then distill to obtain the pure heterocyclic polymercaptan.

The new polymercaptans can also be prepared by other suitable methods. One additional method comprises reacting the corresponding halogen-substituted heterocyclic compound with sodium bisulfide under hydrogen sulfide pressure. The sodium bisulfide is preferably employed in excess of that needed to convert the halogen atoms, and is preferably used in amounts varying from about 2 to 5 times the amount needed for conversion. The reaction with sodium bisulfide is preferably accomplished in the presence of a solvent or diluent, such as ethanol, methanol or mixtures of alcohols with water. The temperature employed for the reaction will preferably vary from about 50° C. to 120° C. with a preferred range varying from about 70 to 80° C. The pressure of the hydrogen sulfide preferably varies from about 200 to 600 p.s.i.g. In recovering the desired product, the hydrogen sulfide pressure is released, the product neutralized with acetic acid and the mixture stripped of solvent and subsequently distilled to give the desired heterocyclic polymercaptan.

Another less preferred method comprises reacting the halogenated derivative with thiourea in a solvent, such as ethanol, and then reacting the resulting product with ammonia to convert the thiouronium salt to the desired polymercaptan. The conversion may also be accomplished by a special technique of reacting the thiouronium salt with sodium bisulfide.

The new heterocyclic polymercaptans of the present invention are fluid to viscous liquids or solids. They have active mercapto groups and at least three per molecule. They are generally free of odor and non-toxic. They are soluble in conventional solvents, such as benzene, aliphatic hydrocarbons, ethers, esters and the like. They are also compatible with conventional resins, tars, oils, polymers and the like, such as asphalts, coal tars, rosin, phenol-formaldehyde resins, vinyl polymers, and particularly epoxy resins.

As noted above, they are particularly useful and valuable as curing agents for the polyepoxides.

The polyepoxides to be used in the process of the invention comprise those materials possessing more than one vicinal epoxy group, i.e., more than one

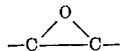

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference to this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tartarate, di(4,5-epoxytetradecyl) maleate, di(2,3-epoxybutyl) azelate, di(3,4-epoxybutyl) citrate, di(5,6-epoxyoctyl) cyclohexane-1,2-dicarboxylate, di(4,5-epoxyoctadecyl) malonate.

Another group of the epoxy-containing materials includes those epoxidized esters of unsaturated alcohols and unsaturated carboxylic acids, such as 2,3-epoxybutyl 3,4-epoxypentanoate, 3,4-epoxyhexyl 3,4-epoxyhexyl 3,4-epoxypentanoate, 3,4 - epoxycyclohexyl 3,4 - epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eiconsanedioate, dihexyl 6,7,10,11-diepoxyhexadecanedioate, didecyl 9-epoxy-ethyl-10,11-epoxyoctadecanedioate, dibutyl 3-butyl - 3,4,5,6 - diepoxycyclohexane-1,2 - dicarboxylate, dicyclohexyl 3,4,5,6 - diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acryonitrile copolymers (Hycar rubbers), butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenyl) pentane (epoxy value of 0.514 eq./100 g.) and the like and mixtures thereof.

The amount of new polymercaptans to be employed in the cure of the polyepoxide may vary within certain limits. In general, the polyepoxides are combined with at least .8 equivalent of the polymercaptan. As used herein "equivalent" amount refers to that amount needed to furnish one —SH group per epoxy group to be reacted. Preferably the polymercaptans and polyepoxides are combined in chemical equivalent ratios varying from .8:1.5 to 1.5:8.

It is preferred in some cases to employ activators for the cure. Examples of these include, among others, phenols, sulfides, mercaptans, organic phosphines, organic arsines, organic antimony compounds, amines, amine salts or quaternary ammonium salts, etc. Preferred activators are the phenols, phosphines, arsines, amines, and sulfides, such as, for example benzyldimethylamine dicyandiamide, p,p'-bis(dimethylaminophenyl) methane, pyridine, dimethyl aniline, dimethylethanolamine, methyldiethanolamine, morpholine, dimethylaminopropylamine, dibutyl aminopropylamine, stearyldimethylamine, tri - n - butyl amine, N,N-dibutyl butylamine, tri-n-hexylamine, ethyl di-n-propylamine, phenylene diamine, diethylene triamine, dibutyl sulfide, dioctyl sulfide, dicyclohexyl sulfide and the like, and mixtures thereof. The salts may be exemplified by the inorganic and organic acid salts of the amines, such as, for example, the hydrochloride, sulfate and acetate of each of the above-described tertiary amines. The quaternary ammonium salts may be exemplified by the following: benzyltrimethylammonium chloride, phenyltributylammonium chloride, cyclohexyltributylammonium sulfate, benzyltrimethylammonium sulfate, benzyltrimethylammonium borate, diphenyldioctylammonium chloride, and the like, and mixtures thereof.

Preferred activators to be used are the sulfides, phosphines and tertiary amines, and more preferably the mono- and diamines wherein the amine hydrogens have been replaced by aliphatic, cycloaliphatic or aromatic hydrocarbon radicals containing not more than 15 carbon atoms, such as, for example, the trialkyl amines, triaryl amines, triarylalkylamines, alkyl arylalkylamines, tricycloalkylamines, alkyl dicycloalkylamines, diaminoalkanes, diakylene triamines, phenylene diamines and di(aminoaryl) alkanes. Preferred amine salts are the hydrochloride, sulfate and acetate of the above-described preferred amines. The preferred quaternary salts are those of the formula

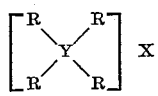

wherein Y is nitrogen, R is an alkyl, aryl or arylalkyl radical, preferably containing no more than 12 carbon atoms and X is chlorine.

The activators noted above are generally employed in amounts varying from 0.1 part of 4 parts per 100 parts of polyepoxide, and preferably from 1 part to 3 parts per 100 parts of polyepoxide.

In curing the polyepoxides, it is usually desirable to have the polyepoxide in a mobile condition when the polymercaptan is added in order to facilitate mixing. The polyepoxides, such as the glycidyl polyether of polyhydric phenols, are generally very viscous to solid materials at ordinary temperature. With those that are liquid, but too viscous for ready mixing, they are either heated to reduce the viscosity, or have a liquid solvent added thereto in order to provide fluidity. Normally solid members are likewise either melted or mixed with a liquid solvent. Various solvents are suitable for achieving fluidity of the polyepoxide. These may be volatile solvents which escape from the polyepoxide compositions containing the adduct by evaporation before or during the curing such as, esters such as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of the dihydric phenol, in admixture with a normally liquid glycidyl polyether of a polyhydric alcohol. In fact, two or more of any of the polyepoxides may be used together as mixtures. In such a case, the amount of the adduct added and commingled is based on the average epoxide equivalent weight of the polyepoxide mixture.

Various other ingredients may be mixed with the polyepoxide subjected to cure with the novel adducts including pigments, filler, dyes, plasticizers, resins and the like.

The polyepoxides may be cured with the new polymercaptans by merely mixing the two components together, preferably in the presence of the above-noted activators. The cure time may vary from a few minutes to a few hours depending on the type and quantity of reactants and presence of catalyst. Generally, in the presence of activators, the cure takes place readily at room temperature. Fast reaction may be obtained, of course, by applying heat. Preferred temperatures range from about 20° C. to 200° C. With small castings, it is preferred to cure at room temperature and then post cure for a few hours at elevated temperatures, say 40° C. to 170° C.

One important application of the use of the new polymercaptans as curing agents for polyepoxides is in the preparation of laminates or resinous particles reinforced with fibrous textiles. Although it is generally preferred to utilize glass cloth for this purpose, any of the other suitable fibrous materials in sheet form may be employed such as glass matting, paper, asbestos paper, mica flakes, cotton batts, duck, muslin, canvas and the like. It is useful to prepare the laminates from woven glass cloth that has been given prior treatment with well known finishing or sizing agents therefor, such as chrome methacrylate or vinyl trichlorosilane.

In preparing the laminate, the sheets of fibrous materials are preferably first impregnated with the mixture of the polyepoxide, polymercaptan and activator. This is conveniently accomplished by dissolving the polymercaptan in a solvent and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured by the application of heat. A plurality of the impregnated sheets can be superimposed and the assembly cured in a heated press under a pressure of about 25 to 500 or more pounds per square inch. The resulting laminate is extremely strong and resistant against the action of organic and corrosive solvents.

The new compositions of the invention are particularly outstanding as adhesives. In this application they can be used as a paste or solution depending on the method of preparation as described above. Other materials may also be included in the composition, such as pigments, plasticizers, stabilizers and reinforcing fillers, such as aluminum powder, asbestos, powdered mica, zinc duct, Bentonite, ground glass fibers, Monetta clay and the like. These fillers are preferably used in amounts varying from about 10 parts to 200 parts per 100 parts of the polyepoxide and polymercaptan compound. Other materials that may be included include other types of resins, such as phenol-aldehyde resins, urea-aldehyde resins, furfural resins, polyacetal resins, carbonate resins, polyamide resins, and the like.

The films had excellent gloss and appearance and good adhesion to the tin plates. The properties of the resulting coating are as follows:

Set to touch, min. _____ 20.
Cotton free, min. _____ 30.
Dry hand, min. _____ 40.
⅛" mandrel flex test _____ Passed.
Pencil hardness _____ HB.
Solvent, 15 min.:
    Toluene _____ Unchanged.
    Methyl isobutylketone _____ Unchanged.
Cold water, 24 hours _____ Unchanged.
5% aqueous NaOH, 60 min. _____ Unchanged.

EXAMPLE VI

This example illustrates the preparation and properties of 2,4,6-tris(mercaptomethyl) 1,3,5-trioxane.

95.5 parts of 2,4,6-tris(chloromethyl) 1,3,5-trioxane prepared by trimerization of chloroacetaldehyde was dissolved in 500 parts of acetonitrile. This mixture along with 162 parts of sodium triolacetate was charged to a reaction flask equipped with stirrer, thermometer and nitrogen inlet. The mixture was brought to reflux under nitrogen and agitated at that temperature for about 50 hours. The reaction mixture was then added to an ethanol/water mixture. The organic layer was removed and washed. The organic phase was then dried, filtered and stripped at 40° C. 2–3 mm. to yield a light tan liquid. Analysis indicated the resulting product was 2,4,6-tris(mercaptomethyl) 1,3,5-trioxane.

*Analysis.*—Percent C found 40.8, theory 40.6%; percent H found 5.2, theory 5.11%; percent S found 26.7, theory 27.15%.

About 100 parts of Polyether A was combined with 60 parts of 2,4,6-tris(mercaptomethyl) 1,3,5-trioxane and 2 parts of benzyldimethylamine and the mixture spread out as a coating and cured in air at 25° C. The film cured in a short time to form a hard tough resistance coating.

EXAMPLE VII 2,4,6-tris(beta-mercaptoethyl) 1,3,5-trithiane was prepared from the trimer of chlorothiopropionaldehyde by the method shown in Example I. About 60 parts of this material was combined with 100 parts of Polyether A and 2 parts of benzyldimethylamine and the mixture spread out as a coating and cured in air at 25° C. The film cured in a short time to form a hard tough resistant coating.

EXAMPLE VIII 2,4,6 - tris(alpha,beta - dimercaptoethyl) 1,3,5-trioxane was prepared by reacting dichloropropionaldehyde trimer with sodium thiolacetate and treating the resulting product with ammonia. About 50 parts of this material was combined with 100 parts of Polyether A and 2 parts of tributylamine and the mixture spread out as a coating and cured in air at 25° C. The film cured in a short time to form a hard tough resistant coating.

EXAMPLE IX 2,4,5-tris(beta-mercaptoethyl) 1,3-dioxalane is prepared by reacting 2,4,5-tris(beta-chloroethyl) 1,3-dioxalane with sodium thiolacetate and treating the resulting product with ammonia. About 60 parts of this material is combined with 100 parts of Polyether A and 2 parts of benzyldimethylamine and the mixture spread out as a coating and cured in air at 25° C. The film cured in a short time to form a hard tough resistant coating.

EXAMPLE X

Examples I, II and III are repeated with the exception that the polymercaptan employed is: 2,4,6-tri(beta-mercaptoethyl) 1-oxa-3,5-dithiane, 2,4,6-tris(beta-mercaptobutyl) 1,3,5-trioxane, 2,3,6-tris(beta-mercaptoethyl) 1,4-oxazine and 2,4,6-tris(mercaptobutyl) 1,3,5-triazine. Related results are obtained.

EXAMPLE XI

Examples I, VI, VII and VIII are repeated with the exception that the polyepoxide employed is: Polyether B, Polyether C, diglycidyl ether of resorcinol, 1,3,5-triglycidylbenzene, diglycidyl ester of phthalic acid, epoxidized cyclohexenylmethyl cyclohexenylmethylcarboxylate, and epoxidized di-(cyclohexenyl)propane. Related results are obtained.

We claim as our invention:

1. A process for curing and resinifying a polyepoxide having more than one vic-epoxy group which comprises mixing and reacting the polyepoxide with a heterocyclic compound substituted in from 3 to 5 different places on the heterocyclic ring with a —SH radical or a —RSH radical wherein R is an aliphatic hydrocarbon radical containing from 1 to 6 carbon atoms, the heteroatom in the heterocyclic ring being a member of the group consisting of oxygen, sulfur and nitrogen.

2. A process for curing and resinifying a polyepoxide having more than one vic-epoxy group which comprises mixing and reacting the polyepoxide with a curing amount of a heterocyclic compound substituted in at least three different places on the heterocyclic ring with a —SH group or —RSH group wherein R is an aliphatic hydrocarbon radical containing 1 to 6 carbon atoms, no two —SH or —RSH groups being attached to adjacent places on the ring and the heteroatom in the heterocyclic ring being a member of the group consisting of oxygen, sulfur and nitrogen, and in the presence of an activator for the epoxymercaptan reaction.

3. A process as in claim 2 wherein the hetero atom in the heterocyclic ring is oxygen.

4. A process as in claim 2 wherein the heterocyclic compound has the structure:

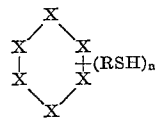

wherein at least one X is a member of the group consisting of oxygen, sulfur, and nitrogen, and the remaining X's are carbon atoms which when not attached to the mercapto-substituted radical are attached in the remaining valences to members of the group consisting of hydrogen, halogen and alkyl radicals, R is an aliphatic hydrocarbon radical containing from 1 to 6 carbon atoms and n is an integer from 3 to 5.

5. A process as in claim 2 wherein the heterocyclic compound is a tris(mercaptoalkyl) trioxane.

6. A process as in claim 2 wherein the heterocyclic compound is a tris(mercaptoalkyl) trithiane.

7. A process as in claim 2 wherein the heterocyclic compound has the structure

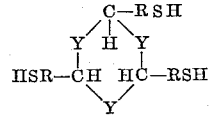

wherein Y is a member of the group consisting of oxygen, sulfur and nitrogen and R is a bivalent aliphatic hydrocarbon radical containing 1 to 6 carbon atoms.

8. A process as in claim 2 wherein the heterocyclic compound is 2,4,6-tris(beta-mercaptoethyl) 1,3,5-trioxane.

9. A process as in claim 2 wherein the accelerator is a tertiary amine.

10. A process as in claim 2 wherein the polyepoxide is a glycidyl ether of a polyhydric compound of the group consisting of polyhydric phenols and polyhydric alcohols.

The compositions may be used in the bonding of a great variety of different materials, such as metal-to-metal to other materials, such as plastic, wood-to-wood, glass-to-glass, glass-to-metal, and the like. They are of particular value, however, in the bonding of the metal such as aluminum-to-aluminum and steel-to-steel. When applied as an adhesive, the compositions may simply be spread on the desired surface to form films of various thicknesses, e.g., 0.5 mil to 30 mils, and then the other surface superimposed and heat applied. Curing pressures can be light contact pressures up to about 500 p.s.i.

When the compositions are used as adhesives for metal-to-metal bonding, it has sometimes been found advantageous to impregnate cotton, rayon, synthetic fiber or glass cloth textiles with the compositions, and then use the impregnated textiles as a bonding tape for joining the metals. Such tapes provide convenient means for handling and using the compositions in adhesive applications. The tape is inserted between two metals desired to be joined, and the assembly is heated and baked to cure the resin whereby articles are obtained wherein the joined surfaces have not only excellent strength at ordinary temperatures, but also retain good strength even though heated at quite elevated temperatures for long periods of time. A preferred tape for such use comprises a glass fiber textile impregnated or coated with a mixture of the polyepoxide, phthalocyanine compound and atomized aluminum powder or dust.

To illustrate the manner in which the invention may be carried out the following examples are given. It is to be understood, however, that the examples are for the purpose of illustration and that the invention is not to be regarded as limited to any of the specific conditions or reactants recited therein. Unless otherwise specified parts described in the examples are parts by weight.

The polyethers referred to herein by letter are those described in U.S. 2,633,458.

EXAMPLE I

This example illustrates the preparation and properties of 2,4,6-tris(beta-mercaptoethyl) 1,3,5-trioxane and the intermediate trithiolacetate derivative.

136.8 parts of beta-chloropropionaldehyde trimer, 193.1 parts of sodium thiolacetate and 587.0 parts of acetonitrile were added to a reaction flask and refluxed for 3½ hours (pot temp. 87° C.) with agitation under nitrogen. The reaction mixture was then filtered to remove salts. The filtrate was stripped and stabilized at 40° C./1 mm. The product (93% yield) was a dark, viscous oil identified as the tri-thiolacetate derivative

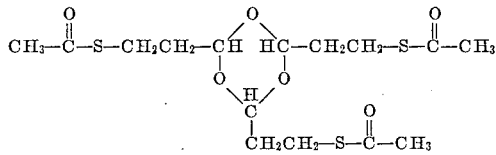

*Analysis.*—Percent C theory 45.4, found 45.1; percent H theory 6.06, found 6.1; percent S theory 24.3, found 24.7.

14.7 parts of the above noted thiolacetate was dissolved in 100 parts of absolute alcohol. Ammonia was bubbled into the reaction mixture overnight at room temperature. The mixture was stripped, filtered and dried. The product (84% yield) was a fluid liquid identified as 2,4,6-tris (beta-mercaptoethyl) 1,3,5-trioxane.

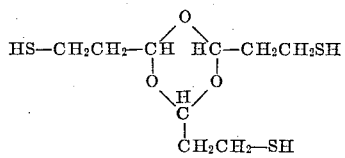

*Analysis.*—Percent C theory 40.0%, found 41.0%; percent H theory 6.7%, found 6.7%; percent S theory 35.6%, found 34.0%; mercaptan 0.98 eq./100 g., theory 1.11 eq./100 g.

About 100 parts of Polyether D, 22 parts of 2,4,6-tris(beta-mercaptoethyl) 1,3,5-trioxane produced above, 2 parts of tris(dimethylaminomethyl)phenol and 43 parts of 50/50 mixture toluene and methyl ethyl ketone were mixed together with stirring. The resulting fluid composition was spread out as a coating (about 2.5 mils thick) on tin panels. The coating was allowed to cure in air at 25° C. The properties of the resulting coating are as follows:

| | |
|---|---|
| Set to touch, min. | 20. |
| Cotton free, min. | 30. |
| Dry hand, min. | 40. |
| ⅛″ mandrel flex test | Passed. |
| Pencil hardness | B. |
| Solvents, 15 min.: | |
| Toluene | Unchanged. |
| Methyl isobutylketone | Unchanged. |
| Cold water, 24 hours | Unchanged. |
| 5% aqueous NaOH, 60 min. | Unchanged. |

EXAMPLE II 100 parts of Polyether A was combined with 60 parts of 1,3,5-tris(beta-mercaptoethyl) 2,4,6-trioxane and 2 parts of benzylmethylamine and the mixture was used as an adhesive for etched aluminum. The mixture was applied between two pieces of aluminum and the assembly cured at room temperature and at 100° C. The strengths of the bonds are indicated below:

| | P.s.i. tensile shear |
|---|---|
| Cured 2 hrs., 100° C. | 5604 |
| Cured 3 days at room temp. | 1372 |

EXAMPLE III

The adhesive shown in Example II was used to bond concrete to concrete. The strengths are shown below:

| | P.s.i. |
|---|---|
| Cured 48 hours, room temp. (no catalyst) | 528 |
| Cured 48 hours, room temp. | 540 |
| Cured 48 hours, room temp. and soaked in water one week | 422 |

All breaks were concrete failures rather than bond failures.

EXAMPLE IV

About 100 parts of Polyether A was combined with 60 parts of 2,4,6-tris(beta-mercaptoethyl) 1,3,5-trioxane and 2 parts of tris(dimethylaminomethyl)phenol and the mixture spread out as a coating (about 3.0 mils thick) on tin panels. The coating was allowed to cure in air at 25° C. The films had good gloss and adhesion. The properties of the resulting coating are as follows:

| | |
|---|---|
| Set to touch, min. | 20. |
| Cotton free, min. | 25. |
| Dry hand, min. | 30. |
| ⅛″ mandrel flex test | Passed. |
| Pencil hardness | F. |
| Solvents, 15 min.: | |
| Toluene | Unchanged. |
| Methylisobutylketone | Unchanged. |
| Cold water, 24 hours | Unchanged. |
| Aqueous NaOH, 60 min. | Unchanged. |

EXAMPLE V

About 100 parts of Polyether B, 38 parts of 2,4,6-tris(beta-mercaptoethyl) 1,3,5-trioxane, 2 parts of tris (dimethylaminomethyl)phenol and 43 parts of 50/50 mixture of toluene and methyl ethyl ketone were mixed together with stirring. The resulting composition was spread out as a coating (about 2.5 mils thick) on tin panels. The coating was allowed to cure in air at 25° C.

11. A process for curing a glycidyl ether of bis(hydroxyphenyl) propane which comprises reacting the compound with a tris(mercaptoalkyl) trioxane in the presence of .01 to 5% by weight of a tertiary amine.

12. A composition comprising a mixture of a polyepoxide having more than one vic-epoxy group and a heterocyclic compound substituted in from 3 to 5 different places on the heterocyclic ring with a —SH group or —RSH group wherein R is an aliphatic hydrocarbon radical containing from 1 to 6 carbon atoms, the heteroatom in the heterocyclic ring being a member of the group consisting of oxygen, sulfur and nitrogen.

13. A composition comprising a mixture of a polyepoxide having more than one vic-epoxy group and a poly(mercaptoalkyl) trioxane wherein there are from 3 to 5 mercaptoalkyl groups on the trioxane molecule.

14. A composition obtained by reacting a polyepoxide having more than one vic-epoxy group with heterocyclic compound substituted in from 3 to 5 different places on the heterocyclic ring with a —SH or —RSH group wherein R is an aliphatic hydrocarbon radical containing from 1 to 6 carbon atoms, the heteroatom in the heterocyclic ring being a member of the group consisting of oxygen, sulfur and nitrogen, and a tertiary amine activator.

References Cited by the Examiner
UNITED STATES PATENTS 2,915,485   12/1959   Shokal _____ 260—47

SAMUEL H. BLECH, *Primary Examiner.*

T. D. KERWIN, *Assistant Examiner.*